US008682456B2

(12) United States Patent
Kimura

(10) Patent No.: US 8,682,456 B2
(45) Date of Patent: Mar. 25, 2014

(54) MACHINE TOOL

(71) Applicant: Mori Seiki Co., Ltd., Nara (JP)

(72) Inventor: Akira Kimura, Nara (JP)

(73) Assignee: Mori Seiki Co., Ltd., Nara (JP)

( * ) Notice: Subject to any disclaimer, the term of this patent is extended or adjusted under 35 U.S.C. 154(b) by 0 days.

(21) Appl. No.: 13/692,236

(22) Filed: Dec. 3, 2012

(65) Prior Publication Data

US 2013/0149062 A1    Jun. 13, 2013

(30) Foreign Application Priority Data

Dec. 13, 2011  (JP) .................................. 2011-272078

(51) Int. Cl.
    G05B 19/18   (2006.01)
    B23C 1/16    (2006.01)
    B23C 1/18    (2006.01)

(52) U.S. Cl.
    USPC ............................................. 700/57; 409/80

(58) Field of Classification Search
    USPC ............................................. 700/57; 409/80
    See application file for complete search history.

(56) References Cited

U.S. PATENT DOCUMENTS

| 5,730,643 | A  | * | 3/1998 | Bartlett | ........................ | 451/127 |
| 6,470,225 | B1 | * | 10/2002 | Yutkowitz | ........................ | 700/44 |
| 2010/0092273 | A1 | * | 4/2010 | Oda et al. | ........................ | 414/728 |

FOREIGN PATENT DOCUMENTS

JP        2009-146057        2/2009

* cited by examiner

Primary Examiner — Tejal Gami
Assistant Examiner — Ziaul Karim
(74) Attorney, Agent, or Firm — Miller, Matthias & Hull LLP

(57) ABSTRACT

A machine tool has a holding portion, spindle, feed device, controller generating a position control signal according to machining data and controlling a feed motion of a drive unit according to the position control signal, reaction force detecting section for determining a reaction force the tool receives from the workpiece during machining, displacement amount calculating section for determining displacement of the tool with respect to a target control position based on the reaction force, and compensating section receiving the displacement amount and adding correction data for eliminating the displacement amount to the position control signal or the machining data.

2 Claims, 4 Drawing Sheets

MACHINE TOOL

TECHNICAL FIELD

The present disclosure relates to a machine tool having a holding portion holding a workpiece and a spindle holding a tool, wherein the machine tool machines the workpiece into a target shape on the basis of machining data.

BACKGROUND OF THE DISCLOSURE

In a conventional machine tool, it is known to use a feed device to move a workpiece holding portion relative to a spindle by driving at least one of the workpiece holding portion and the spindle by means of a drive unit. A typical feed device is configured with a guide mechanism for guiding a movable body and a drive mechanism for moving the movable body, and has a configuration in which operation of the drive mechanism is controlled by a controller.

As the guide mechanism, for example, a configuration comprising a slide guide mechanism or a rolling guide mechanism is given, and as the drive mechanism, a configuration comprising a ball screw, a nut screwed onto the ball screw and fixedly provided on the movable body, and a drive motor for rotating the ball screw about an axis thereof to move the movable body in the direction of the axis of the ball screw is given.

The controller generates a control signal on the basis of a target moving position of the movable body and transmits a drive current based on the generated control signal to the drive motor, thereby driving the drive motor. Thereby, the ball screw is rotated about the axis thereof and the movable body is moved to the target moving position.

In a machine tool, a very high machining accuracy is generally required, and therefore various techniques to correct a feeding position error, such as a position error correction method as described in the patent document 1, for example, are used. The patent document 1 discloses a method of correcting a position error for a case where three axes are not strictly perpendicular to one another due to a manufacturing error or the like and there is a squareness error between each axis. In a conventional machine tool, such a correction technique is used to correct a feeding position error, thereby achieving a highly accurate machining.

SUMMARY OF THE DISCLOSURE

In a machine tool, when a workpiece is machined by a tool, a force is applied to the workpiece from the tool, and, necessarily, as a reaction force in response of the force, the tool is pushed by the workpiece and the tool is displaced from its control position. The displacement of the tool due to this machining reaction force results from displacement of components such as a spindle supporting the tool, a column, a bed and a table as well as displacement of the tool itself, and accurate positioning control of the tool is hindered as much as the amount of the displacement of the tool due to the machining reaction force. This is a reason why machining accuracy is reduced as the amount of the displacement of the tool due to the machining reaction force increases. This is a serious problem in a case where a tool which is soft and has a small rigidity, such as an elongate end mill, is used as the tool, which leads to a great reduction of machining accuracy.

For solving the above problem, a method of increasing the rigidities of the tool and the device system supporting the tool can be considered. However, actually, there is never a perfectly rigid body, and therefore, even if the rigidities are increased, a small displacement of the tool always occurs due to the machining reaction force when machining the workpiece. As a result thereof, the occurrence of reduction of machining accuracy cannot be avoided.

In a conventional machine tool, the displacement of the tool caused by the machining reaction force is not taken into consideration, the tool and the device system supporting the tool are treated as perfectly rigid bodies having an infinite strength in an inertial space and the tool etc. are assumed to be never deformed, and a machining error resulting from the displacement with respect to the control position caused by the machining reaction force is not compensated. Therefore, no matter how much accuracy of positioning the feed device itself is increased as conventionally, it is not possible to avoid influence of the displacement of the tool caused by the machining reaction force, and therefore improvement of the machining accuracy is limited.

In order to mitigate the influence of the displacement of the tool (offset from a target control position) due to the machining reaction force, experientially, a process of performing additional cutting through gradual steps such as rough finishing, semi-finishing and finishing or a processing of reducing the machining reaction force by slowing down the feed processing of the feed device has been performed. However, these processes make the machining time of the machine tool longer and therefore improvement in this point has been desired.

In view of the above-described circumstances, according to one aspect of the present disclosure a machine tool is provided that is capable of correcting the displacement of the tool due to the machining reaction force to perform a highly accurate machining without necessitating gradual additional cutting or slowdown of the feed device.

More specifically, such a machine tool may include:
a workpiece holding portion holding a workpiece;
a spindle holding a tool;
a feed device which has a drive unit and which relatively moves the workpiece holding portion and the spindle by driving at least one of the workpiece holding portion and the spindle by means of the drive unit;
a control unit which generates a position control signal according to machining data for machining the workpiece into a target shape by means of the tool and controls a feed motion of the drive unit according to the position control signal;
a reaction force detecting unit which detects a reaction force the tool receives from the workpiece by machining;
a displacement amount calculating unit which calculates a displacement amount of the tool with respect to a target control position for position control on the basis of the reaction force detected by the reaction force detecting unit; and
a compensating unit which receives the displacement amount calculated by the displacement amount calculating unit and adds correction data for eliminating the displacement amount to the position control signal or the machining data.

According to this machine tool, when a workpiece held by the workpiece holding portion is machined by a tool held by the spindle, at least one of the workpiece holding portion and the spindle is driven by the feed device having the drive unit, and thereby the workpiece holding portion and the spindle are relatively moved. Further, in the control unit, a position control signal is generated according to machining data for machining the workpiece into a target shape by means of the tool, and a feed motion of the drive unit is controlled according to the position control signal.

Further, when the workpiece is machined by the tool, a reaction force which the tool receives from the workpiece (that is, a reaction force in response to the force the workpiece receives from the tool) is detected by the reaction force detecting unit, and a displacement amount of the tool is calculated by the displacement amount calculating unit on the basis of the detected reaction force. This displacement amount of the tool is the total of displacement amounts of components such as the tool itself, a spindle system supporting the tool, a column, a bed and a table, which are caused by the machining reaction force the tool receives from the workpiece. That is, due to the existence of the machining reaction force, the position of the tool is offset by as much as the displacement amount of the tool from a target control position (command value) commanded by the control unit.

For example, the displacement amount calculating unit can previously calculate an elastic constant reflecting the rigidities of all the components including the tool on the basis of the size of the machining reaction force and the displacement amount which is the total of the displacement amounts of all the components (that is, the displacement amount of the tool with respect to the target control position for position control), and use the elastic constant to calculate, from the machining reaction force detected by the reaction force detecting unit, the displacement amount of the tool based on the machining reaction force, as described above. It is noted that the displacement amount calculating unit may have the elastic constant as a known value based on a result of a structural mechanics calculation or the like.

Subsequently, the compensating unit receives the displacement amount of the tool calculated by the displacement amount calculating unit and adds correction data for eliminating the displacement amount to the position control signal or the machining data.

Therefore, because the position control signal or machining data to which the correction data has been added is a position control signal or machining data in which the displacement amount of the tool due to the machining reaction force from the workpiece is compensated, when the feed motion of the feed device is controlled according thereto, a moving position of the feed device can be controlled more accurately as compared with the conventional machine tool in which the displacement amount of the tool due to the machining reaction force is not compensated.

Further, because compensating the displacement amount of the tool due to the machining reaction force suppresses a poor position control accuracy which is caused by the displacement, gradual additional cutting such as rough finishing, semi-finishing and finishing is not necessitated, and if such a gradual machining is performed, machining accuracy thereof can be further improved. Furthermore, because the slowdown of the feed device is not necessitated, a motion control in which acceleration performance of the feed device is utilized to the maximum can be achieved, thereby shortening a moving time of the feed device.

Furthermore, in the above-described configuration, the drive unit may include a drive motor and the reaction force detecting unit detects the reaction force on the basis of an amount of change of value of a current through the drive motor.

According to the above configuration, in a case where the drive unit comprises a typical drive motor, the reaction force detecting unit detecting the machining reaction force the tool receives form the workpiece can easily and simply detect the machining reaction force by observing an amount of change of value of a current through the drive motor. Because the detection of the machining reaction force and the correction of the displacement amount due to the machining reaction force are thereby achieved, it is possible to effectively achieve the correction of the displacement amount caused by the machining reaction force in the machine tool without complicating the machine.

When a workpiece is machined by a tool, it is possible to mitigate the influence of displacement of the tool caused by a machining reaction force the tool receives from the workpiece and achieve a highly accurate machining without necessitating gradual additional cutting and slowdown of a feed device.

DETAILED DESCRIPTION

Hereinafter, a first embodiment will be described with reference to the drawings.

1. General Configuration of Machine Tool

Figure 1:
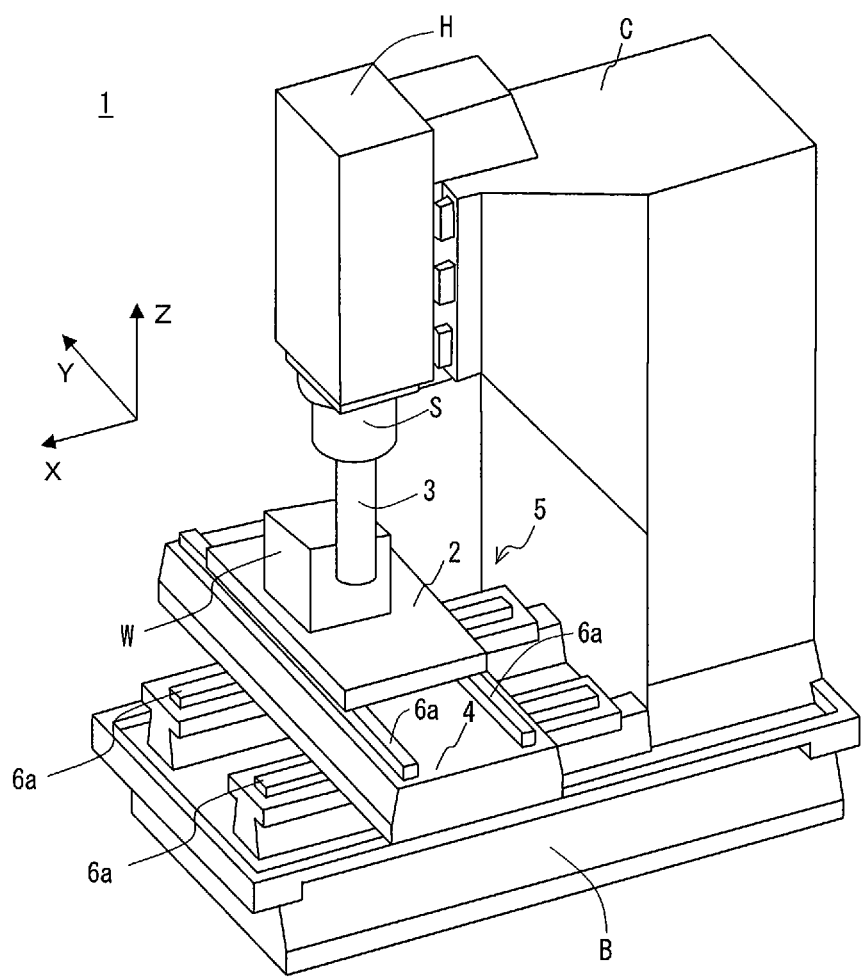
FIG. 1 is a schematic drawing showing the appearance of a machine tool according to one embodiment of the present disclosure.

As shown in FIG. 1, a machine tool 1 of the first embodiment has a table 2 fixedly holding a workpiece W by means of a clamp (not shown), a spindle S to which a tool 3 is attached, a saddle 4 supporting the table 2, and a feed device 5 feeding the table 2 and the saddle 4 in the Y-axis direction and the Z-axis direction shown in the drawing, respectively, by means of a drive motor. The spindle S is mounted to a spindle head H which moves in the Z-axis direction shown in the drawing (in the vertical direction in the drawing) with respect to a column C, and therefore the spindle S is freely slidable in the Z-axis direction. The machine tool 1 controls motions of the feed device 5 and the spindle head H according to a predetermined machining data to machine the workpiece W into a three-dimensional target shape by means of the tool 3. In this embodiment, the tool 3 comprises an end mill.

The machine tool 1 is configured to move the table 2 in the Y-axis direction on the saddle 4 by means of the feed device 5 and move the saddle 4 in the X-axis direction on a bed B supporting the saddle 4 to thereby freely feed the workpiece W in an XY plane. This feeding is controlled by a controller 20 (see FIG. 2), and the controller 20 generates a position control signal according to machining data for machining the workpiece W into a target shape and controls a feed motion of a drive unit of the feed device 5 according to the position control signal.

Figure 2:
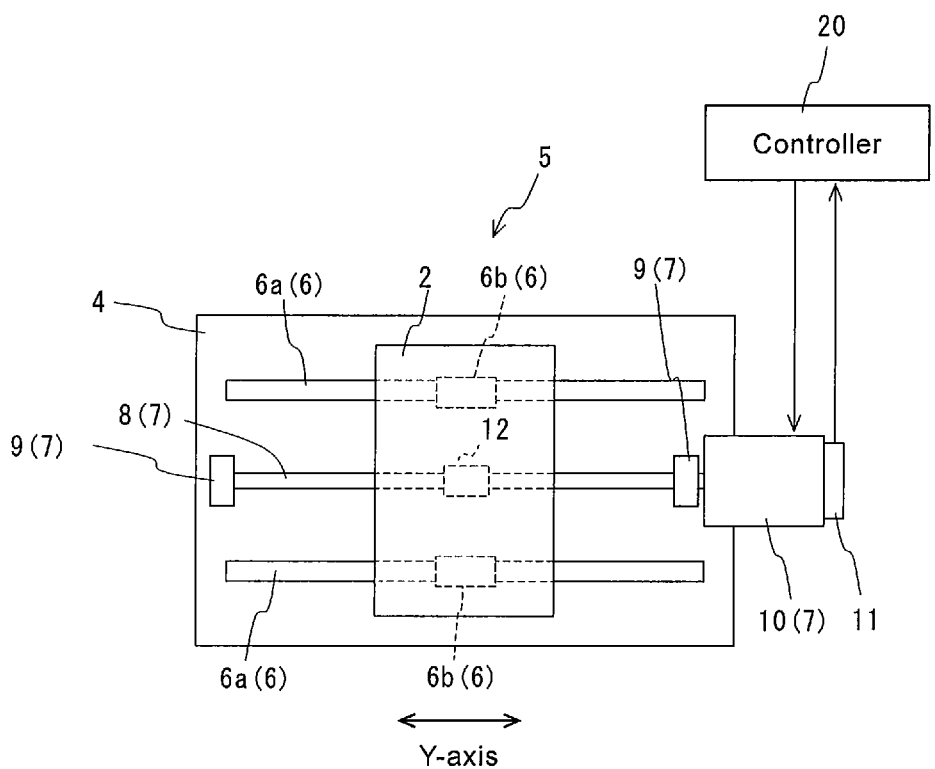
FIG. 2 is a schematic drawing showing the configuration of the feed device in the embodiment.

FIG. 1 shows the appearance of the machine tool 1 according to the first embodiment, and an upper mechanism of the feed device 5 (a feed mechanism for the Y-axis direction) comprises a guide mechanism 6 supporting the table 2 so that the table 2 is freely movable in the Y-axis direction on the saddle 4, and a drive mechanism 7 for moving the table 2. FIG. 2 is a view seen from above of a configuration example of the feed device 5 comprising the guide mechanism 6 and the drive mechanism 7. That is, FIG. 2 shows a configuration of the feed device 5 for sliding the table 2 in the Y-axis direction on the saddle 4, and the table 2 is slidable in the Y-axis direction according to rotation of a ball screw 8. In FIG. 2, the guide mechanism 6 comprises two guide rails 6a disposed parallel to each other along the Y-axis direction on the saddle 4 and two sliders 6b which are engaged with the two guide rails 6a respectively and are guided by the guide rails 6a to move, and guides the Y-directional movement of the table 2 placed on the sliders 6b and fixed thereon.

Further, in FIG. 2, the drive mechanism 7 comprises the ball screw 8 disposed between the two guide rails 6a along them, a support member 9 which is fixedly provided on the saddle 4 and supports both end portions of the ball screw 8 so that the ball screw 8 is rotatable, a drive motor 10 which is fixedly provided on the saddle 4 and rotates the ball screw 8 about an axis thereof, a position detector 11 detecting a rotation amount of the drive motor 10, and a nut 12 which is screwed onto the ball screw 8 and is fixedly provided on the bottom of the table 2. It is noted that the saddle 4 in FIG. 1 has mechanisms similar to the guide mechanism 6 and the drive mechanism 7 which are shown in FIG. 2, and therefore the saddle 4 is configured to be freely slidable in the X-axis direction on the bed B.

2. Controller Configuration

A configuration (functional blocks) of the above-mentioned controller 20 will be described using FIG. 3.

Figure 3:
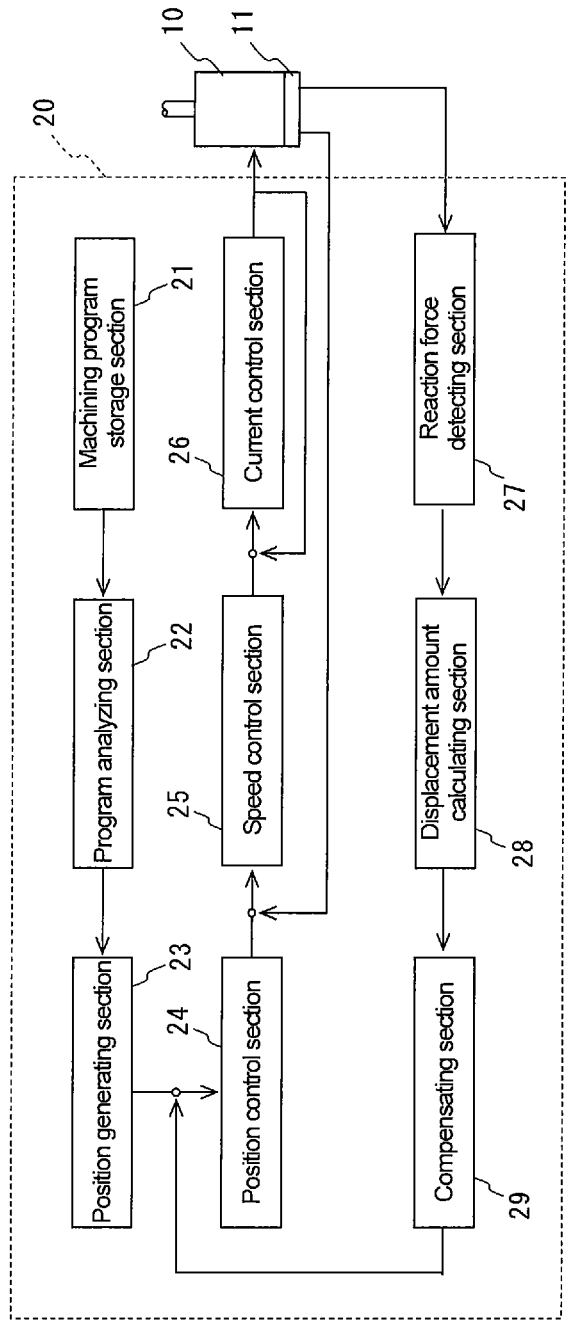
FIG. 3 is an illustration showing an example of the configuration of the controller in the embodiment.

As shown in FIG. 3, the controller 20 comprises a machining program storage section 21, a program analyzing section 22, a position generating section 23, a position control section 24, a speed control section 25, a current control section 26, a reaction force detecting section 27, a displacement amount calculating section 28 and a compensating section 29.

The machining program storage section 21 is a functional section in which a previously generated machining program is stored, and transmits the stored machining program to the program analyzing section 22.

The program analyzing section 22 analyzes the machining program received from the machining program storage section 21 and extracts commands relating to a feed rate, a moving position etc. of the feed device 5, and transmits the extracted commands to the position generating section 23.

The position generating section 23 generates, on the basis of the commands received from the program analyzing section 22, signals (operation command signals as control signal) relating to a target moving position of the feed device 5 every time period (every predetermined time period) in consideration of a predetermined time constant, and transmits the generated signals to the position control section 24 one by one.

The position control section 24 generates a speed command signal on the basis of the operation command signal (position control signal) transmitted from the position generating section 23, and transmits the generated speed command signal to the speed control section 25.

The speed control section 25 generates a current command signal on the basis of a deviation between the speed command signal transmitted from the position control section 24 and actual speed data transmitted (fed back) from the position detector 11, and transmits the generated current command signal to the current control section 26.

The current control section 26 transmits to the drive motor 10 a drive current based on a deviation between the current command signal transmitted from the speed control section 25 and an actual current signal fed back, and operation of the drive motor 10 is controlled by this drive current.

As described above, in the machine tool 1 of this embodiment thus configured, initially, a machining program stored in the machining program storage section 21 is read out by the program analyzing section 22, and commands relating to a feed rate and a moving position of the feed device 5 are extracted from the machining program by the program analyzing section 22 and the extracted commands are transmitted to the position generating section 23.

The position generating section 23 generates an operation command signal on the basis of the commands transmitted from the program analyzing section 22, and transmits the operation command signal to the position control section 24.

Subsequently, the position control section 24 generates a speed command signal on the basis of the received operation command signal and transmits the speed command signal to the speed control section 25, the speed control section 25 generates a current command signal on the basis of the received speed command signal and transmits the current command signal to the current control section 26, the current control section 26 generates a drive command signal on the basis of the received current command signal and transmits the generated drive command signal to the drive motor 10, and the drive motor 10 is driven and controlled according to this drive command signal.

At this time, a tracking error for speed is compensated by actual speed data which is fed back from the position detector 11, and a tracking error for current is compensated by feedback of an actual current signal.

The reaction force detecting section 27 is a functional section detecting the size of a reaction force which the tool 3 receives from the workpiece W. For explaining a specific operation of the reaction force detecting section 27 detecting the reaction force, a case is considered in which the tool 3 comprising an end mill is used to cut a surface parallel to the axis of the tool 3 on the machine tool 1 as shown in FIG. 1. When the direction of operation of the end mill in this case is the X-axis direction and a force is applied so that the workpiece W is cut in the positive Y-axis direction, a machining reaction force F in response to the force occurs in the negative Y-axis direction. Therefore, the tool 3 is displaced by as much as Δ with respect to the target control position for position control. This displacement Δ is the total or a combination of a displacement amount of the tool 3 itself due to the machining reaction force F and displacement amounts of components, such as the spindle supporting the tool 3, the column, the bed and the table, due to the machining reaction force F. Because of the occurrence of the displacement Δ, the actual position of a machined surface formed by the tool is offset in the negative Y-axis direction by as much as Δ with respect to the position where the machined surface should be formed according to the actual commands and there occurs a state where the cutting is insufficient.

The reaction force detecting section 27 detects the machining reaction force F which causes the displacement Δ of the tool 3 by observing a current value of the drive motor 10. The size of the machining reaction force F is equal to the size of the Y-directional force the workpiece W receives from the tool 3, and because the workpiece W is clamped on the table 2, the force the workpiece W receives is transmitted to the drive motor 10 for the Y-axis direction through the table 2. Therefore, the machining reaction force F can be detected by observing the force transmitted to the drive motor 10 (that is, change of a torque value of the drive motor 10).

Here, as an important premise, it is confirmed that the Y-directional force acting on the workpiece W is transmitted to the drive motor 10 also in a case of a ball-screw driving as described above. A transmission rate ratio A of force transmission in a direct operation (force transmission from the drive motor 10 to the table 2) to force transmission in a reverse operation (force transmission from the table 2 to the drive motor 10) is represented by the following equation.

$$A=(\tan\theta-\text{coefficient of friction of ball})/\tan\theta \quad \text{Equation 1:}$$

Since the coefficient of friction of ball is between 0.001 and 0.003, the value of 0.003 of the above range is employed for the coefficient of friction of ball in Equation 1 as a value for estimating the transmission value of the reverse operation to be a small value, and a trail calculation is performed below. Since θ in Equation 1 is an angle of the ball screw groove, when the diameter of the ball screw is 40 mm and the lead thereof is 20 mm, Equation 2 is established.

$$\tan\theta=20/(40*\pi)=0.159 \quad \text{Equation 2:}$$

When this value of tan θ is substituted for Equation 1, the transmission rate ratio A is as follows.

$$A=(0.159-0.003)/0.159=0.98 \quad \text{Equation 3:}$$

That is, it is found that efficiency of the force transmission in the reverse operation (force transmission from the table 2 to the drive motor 10) when using a ball screw is reduced by only 2% with respect to efficiency of the force transmission in the direct operation (force transmission from the drive motor 10 to the table 2) (100%). That is, the efficiency of the force transmission in the reverse operation is sufficiently high similarly to the direct operation, and therefore, also in the case where the Y-directional force acting on the workpiece W is transmitted to the drive motor 10 through the ball screw 8, the size of the Y-directional force is sufficiently reflected on the torque value (current value) of the drive motor 10.

Therefore, the reaction force detecting section 27 can detect the force transmitted to the drive motor 10 through the table 2 by observing an amount of change of the current value (torque value) of the drive motor 10. A reason why the amount of change of the current value is observed instead of the current value itself is that a certain current value (background component) exists in the drive motor 10 also in a state where the tool 3 is not in contact with the workpiece W, that is, in a state where the displacement amount of the tool 3 due to the machining reaction force is zero, and this current value has no relation with the displacement of the tool 3 due to the machining reaction force, and therefore a current value from which such a background component is subtracted should be related to the machining reaction force.

That is, the reaction force detecting section 27 can detect the machining reaction force by detecting the amount of change (differential) of the current value of the drive motor 10. However, since various losses (steady friction term, viscous friction term, transmission efficiency of ball screw etc.) occur in an actual torque value, detecting not only the amount of change of the current value of the drive motor 10 but also an amount of change of the number of rotation of the drive motor 10 makes it possible to detect a more accurate torque value, that is, a more accurate machining reaction force.

The displacement amount calculating section 28 is a functional section calculating the displacement amount of the tool 3 on the basis of the size of the machining reaction force detected by the reaction force detecting section 27. Specifically, the displacement amount calculating section 28 calculates the displacement amount Δ of the tool 3 using a relational equation between the machining reaction force F and the displacement amount Δ (F=K×Δ). Here, it is necessary to previously calculate an elastic constant K, and K is a value reflecting the total of the rigidity of the tool 3 and the rigidities of components, such as the spindle system supporting the tool 3, the column, the bed and the table. Although K may be analytically calculated using structural mechanics, such a calculation will be complicated and troublesome.

Therefore, the displacement amount calculating section 28 can easily actually measure the value of the elastic constant K from the displacement amount of the tool with respect to the target control position for position control in the following way.

In the machine tool as shown in FIG. 1, for example, both sides of a workpiece W which has an sufficient thickness in the Y-axis direction are machined by a tool 3 comprising an end mill so that the workpiece W will have a predetermined target dimension T. At this time, a torque in the Y-axis direction (change of the current value of the drive motor 10) is observed and the size of the machining reaction force (F) is detected. As described above, the finished workpiece W is in a state where cutting is insufficient by as much as the displacement amount Δ of the tool 3 due to the machining reaction force with respect to the target control position (cutting is insufficient by as much as 2Δ in total because the workpiece W was machined from both sides thereof), and the finished workpiece W has a dimension larger than the target dimension T by as much as 2Δ. Therefore, the value of Δ is found out by dividing the differential (2Δ) between the actually obtained dimension of the workpiece W and the target dimension T into two, and the relationship between the size of the machining reaction force (F) and the displacement amount (Δ) is obtained. Thereby, the value of the elastic constant K can be obtained from the relationship of F=K×Δ.

As another method of finding out the value of the elastic constant K in the displacement amount calculating section 28, there is a method in which, when a workpiece W is machined by a tool 3, change of the current value of the drive motor 10 occurring in the machining direction (for example, in the Y-axis direction) is observed as a factor relative to the size of the machining reaction force (F) while an actual coordinate movement amount (displacement amount) of the tool 3 is actually measured using a coordinate encoder, and the displacement amount Δ of the tool 3 and the amount of the change of the current value at this time are recorded, thereby finding out the value of the elastic constant K.

Because the value of the elastic constant K is different depending on the type of the tool 3, the value of the elastic constant K of each tool 3 to be used may be previously measured and the displacement amount Δ may be calculated from the machining reaction force F using the value of the elastic constant K corresponding to the tool 3 that is actually used. Alternatively, and for simplification, the attribution (type and situation for use) of the tool 3 may be classified into several types and the elastic constant K may be measured as a representative value for each type, in which case the elastic constant K that is the representative value may be used. The attribution for the classification of the tool 3 includes the type of the tool, tool diameter, overhang, cutting condition (such as depth of cut), the height of arrangement of the tool 3 (the tool 3 is more unstable and is more easily displaced as the arrangement height is higher), etc.

Further, in a case where accuracy of the value of the elastic constant K is sacrificed to some extent for simplification of the method of finding it out, a value of K which is actually measured using a tool 3 having a sufficiently high rigidity (for example, a short and thick end mill) may be used uniformly for various tools 3. Although such a uniform value of K obtained by this measurement does not sufficiently reflect the rigidity (softness) of the tool 3 itself, because other parts than the tool 3 (the machine components such as a spindle, a column, a bed, a table, etc.) are estimated in rigidity, the value is practical as a provisional value.

The compensating section 29, as shown in FIG. 3, is configured to receive the displacement amount Δ calculated by the displacement amount calculating section 28 and add correction data for eliminating the displacement amount to the operation command signal (position control signal) which is transmitted from the position generating section 23. Thereby, the machine tool 1 of this embodiment can correct the displacement amount Δ of the tool 3 due to the machining reaction force, and therefore it is possible to prevent the insufficiency of cutting caused by the displacement of the tool 3 due to the machining reaction force and form the actual machined surface formed by the tool correctly at the position where the machined surface should be formed according to the actual commands, thereby achieving an accurate machining.

Figure 4:
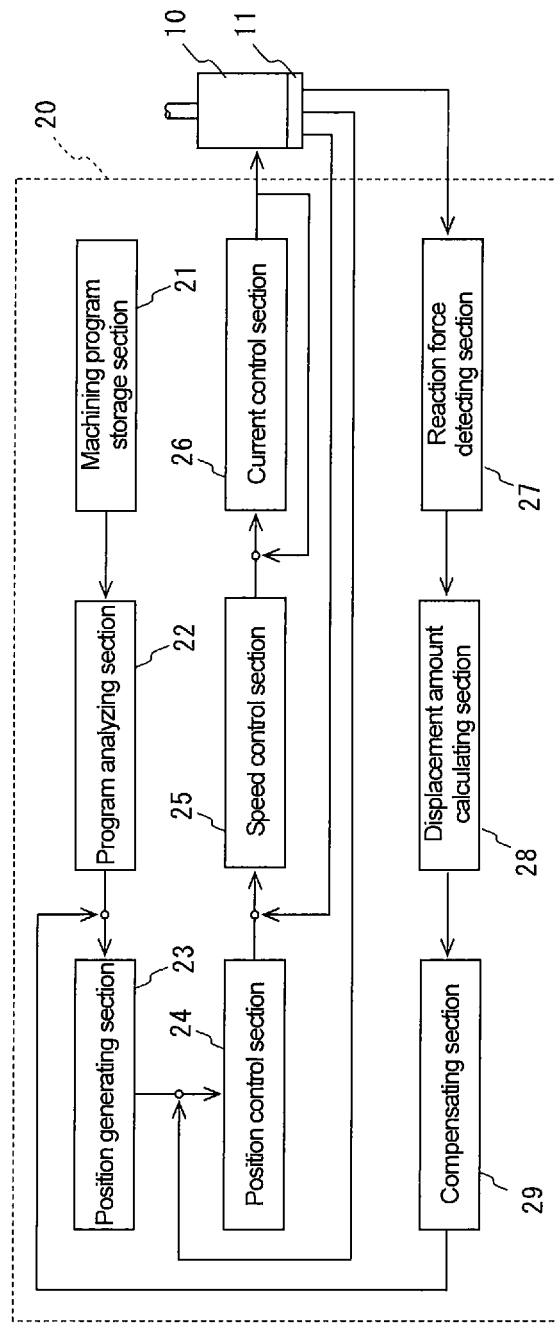
FIG. 4 is an illustration showing another example of the configuration of the controller in the embodiment.

It is noted that, although, in FIG. 3, the compensating section 29 is configured to add the correction data to the operation command signal (position control signal) transmitted from the position generating section 23, instead of this configuration, as shown in FIG. 4, the compensating section 29 may compensate the displacement amount by directly adding the correction data to the command signals relating to the moving position etc. extracted from the machining program by the program analyzing section 22. Alternatively, the compensating section 29 may have a configuration in which the displacement amount due to the machining reaction force is compensated by directly incorporating the correction data into the machining program or a configuration in which the displacement amount due to the machining reaction force is compensated by adding the correction data to output from the position control section 24.

In the above, description has been made about the compensation of the displacement amount due to the machining reaction force for a case where, in FIG. 1, the direction of operation of the end mill is the X-axis direction and a force is applied so that the workpiece W is cut in the Y-axis direction. However, assuming that influence of acceleration and deceleration can be ignored, also as for the machining reaction force for a case where the direction of operation of the end mill is the X-axis direction and a force is applied so that the workpiece W is cut in the X-axis direction, basically the displacement amount can be compensated in a way similar to that described above.

As shown in FIG. 1, as for a machine tool having a feed device for a plurality of directions, it is advantageous that the machining reaction force in each feed-axis direction is measured by the respective reaction force detecting section and the displacement amount of the tool due to the machining reaction force, which is calculated on the basis of the measured reaction force, is corrected for each feed-axis direction.

Further, although, in the above embodiment, the reaction force detecting section 27, the displacement amount calculating section 28, and the compensating section 29 are internal components of the controller 20, the reaction force detecting section 27, the displacement amount calculating section 28, and the compensating section 29 may be external components thereof.

Thus, an embodiment of the present disclosure has been described. However, a specific embodiment in which the present disclosure can be implemented is not limited thereto.

INDUSTRIAL APPLICABILITY

As described above, the present disclosure is applicable to a machine tool which has a workpiece holding portion holding a workpiece and a spindle holding a tool and which machines the workpiece into a target shape on the basis of machining data.

What is claimed is:

1. A machine tool comprising: a workpiece holding portion configured to hold a workpiece;
a spindle configured to hold a tool; a feed device having a drive unit operatively coupled to drive at least one of the workpiece holding portion and the spindle, thereby to relatively move the workpiece holding portion and the spindle;
a control unit configured to determine a position control signal based on machining data for machining the workpiece into a target shape by means of the tool, wherein the drive unit is operably coupled to the control unit and responsive to the position control signal to control a feed motion of the drive unit;
a reaction force detecting unit configured to determine a reaction force the tool receives from the workpiece by machining;
a tool displacement amount calculating unit configured to determine a tool displacement amount of the tool with respect to a target control position for position control on the basis of the reaction force detected by the reaction force detecting unit, the tool displacement amount occurring due to elastic deformation of the tool and an element supporting the tool which is caused by the reaction force, the tool displacement amount calculating unit calculating the tool displacement amount Δ based on an equation $\Delta = F/K$, where F is the reaction force and K is an elastic constant of the tool and the element supporting the tool; and
a compensating unit configured to receive the tool displacement amount calculated by the tool displacement amount calculating unit and add correction data for eliminating the tool displacement amount to the position control signal or the machining data.

2. A machine tool according to claim 1, wherein the drive unit comprises a drive motor, and the reaction force detecting unit determines the reaction force based on an amount of change of value of a current through the drive motor between before and after machining is initiated.

* * * * *